United States Patent
Kwok et al.

[19]

[11] Patent Number: 5,944,943
[45] Date of Patent: Aug. 31, 1999

[54] CARPET SEAMING IRON

[75] Inventors: John Bing Hon Kwok, Mequon, Wis.; Gary Goodrich, Union City, Calif.

[73] Assignee: Orcon Corporation, Union City, Calif.

[21] Appl. No.: 09/014,531

[22] Filed: Jan. 28, 1998

[51] Int. Cl.$^6$ .......................... B29C 65/18; B32B 31/20
[52] U.S. Cl. ................. 156/359; 156/304.4; 156/304.6; 156/304.7; 156/574; 156/579; 219/245
[58] Field of Search .............................. 156/304.1, 304.3, 156/304.4, 304.6, 304.7, 359, 391, 574, 579; 219/245

[56] References Cited

U.S. PATENT DOCUMENTS

| | | | |
|---|---|---|---|
| 1,158,557 | 11/1915 | Rose | 38/82 |
| 2,385,606 | 9/1945 | Campbell | 219/25 |
| 2,725,453 | 11/1955 | Haller | 219/25 |
| 3,927,298 | 12/1975 | Prater | 219/245 |
| 4,322,900 | 4/1982 | Hacker et al. | 38/77.6 |
| 4,536,244 | 8/1985 | Greci et al. | 156/304.4 |
| 4,584,040 | 4/1986 | Anderson | 156/152 |
| 4,714,514 | 12/1987 | Hoopengardner | 156/391 |
| 4,780,173 | 10/1988 | Wentz | 156/574 |
| 4,829,157 | 5/1989 | Loyd | 219/228 |
| 5,333,401 | 8/1994 | Klein | 38/89 |
| 5,384,001 | 1/1995 | Hoopengardner | 156/391 |
| 5,453,150 | 9/1995 | Hoopengardner | 156/391 |

*Primary Examiner*—James Sells
*Attorney, Agent, or Firm*—Medlen & Carroll, LLP

[57] ABSTRACT

An improved carpet seaming electric iron of the kind used for making carpet face seams with hot melt adhesive tapes is disclosed. Improved heat transfer and control is achieved by reducing the thermal mass of the iron baseplate, and by providing a raised channel, integral with the top surface of the base plate, for mounting the heating element to efficiently transmit the heat generated by the heating element through the baseplate. A temperature control switch having a sensor is provided for sensing the temperature of the baseplate at the top surface, and for controlling the flow of current to the heating element to return the baseplate to a desired temperature set by the operator. A heat shield is provided to protect the operator and carpet backings. Lower temperatures at the surface of the heat shield are obtained by using an insulating gasket to eliminate any direct contact between the heat shield and the baseplate, by using brackets and fasteners which do not conduct heat well to attach the heat shield to the baseplate, and by providing the heat shield with a plurality of air inlets around the bottom of the heat shield, and one or more air outlets at the top of the heat shield, to permit air to circulate through the space between the heat shield and the baseplate. When the air is warmed by the base plate, it rises through the air outlet, thus keeping the heat shield cool. A handle which is nonconductive to heat is provided to enable the iron to be manipulated by an operator. This combination provides a lighter carpet seaming iron with excellent thermal control.

22 Claims, 4 Drawing Sheets

CARPET SEAMING IRON

TECHNICAL FIELD OF THE INVENTION

This invention relates generally to wall to wall carpeting installation of carpets, and more particularly to hot melt seaming irons.

BACKGROUND OF THE INVENTION

The installation of wall-to-wall carpeting typically involves joining two or more pieces of carpet together to form an expanse of carpeting sufficiently large to carpet an entire area. Typically, carpet is then rolled out in the room, usually over some padding, cut, fitted, seamed, and stretched. This process is intended to remove any wrinkles or creases in the carpeting, resulting in a flat, safe and visually appealing carpet installation.

In the past, seams were created by sewing two abutting edges of adjoining carpet pieces together, as described in, e.g., U.S. Pat. Nos. 3,440,981, 3,457,884, and 3,499,402, to produce seams of high strength which are able to withstand stretching during installation. However, this method is very labor intensive, and therefore very costly and time-consuming to produce. If done too quickly, or by a person not sufficiently skilled, the joined edges could be improperly aligned or carpet pile caught by the thread, making the seam visible and unsightly. This has proven inimical to the efficient and economical installation of seamed carpeting.

In recent years, carpet installers have turned to seaming using hot melt adhesive seaming tape. This method avoids the significant time and effort burdens imposed by sewing and enables seaming to be conducted by relatively unskilled workers. In this process, a strip of tape having a layer of hot melt adhesive is centered under the seam with the layer of hot melt adhesive facing up. A carpet seaming iron, or other suitable implement, is used to melt the hot melt adhesive, and the carpet backing is pushed into the molten hot melt adhesive with the two edges abutting. The adhesive quickly sets, forming a permanent seam. This method is generally disclosed by, e.g., U.S. Pat. No. 3,972,768, 4,097,445, and 4,416,713.

Temperature control at the base of the carpet seaming iron is very important: if the iron is too cool, the hot melt adhesive will take too long to melt; if the iron is too hot, the adhesive will melt too quickly and the operator will have to work faster than is prudent. Conventional carpet seaming irons are typically produced with solid base plates, which resist quick temperature changes. While this is a useful means of maintaining the correct temperature, it can delay necessary temperature adjustment when the temperature is not correct. A solid base plate also adds substantially to the weight of the iron.

In addition, the base plate and housing of the carpet seaming iron become sufficiently hot at typical operating temperatures to deform or burn the overlying pieces of carpet to be seamed. To prevent damage to the carpet (and injury to the operator), conventional carpet seaming irons are provided with heat shields. However, even with a heat shield, heat can build up inside the housing and cause the handle and heat shield to become quite hot, causing discomfort or even injury to the operator and degradation to the carpet backing. This problem has been addressed in part by U.S. Pat. No. 5,333,401; however the '401 patent requires a complicated arrangement with a two-element sole plate and a pair of spaced apart sheets forming a channel separating the handle from the sole plate through which air can flow from the front of the iron to the rear. These additional elements are not believed to produce a significant decrease in the temperature of the heat shield, but do increase the weight of the iron which will unnecessarily fatigue the operator.

Accordingly, the need exists for a light-weight carpet seaming iron with improved temperature control, which reaches the desired temperature quickly, retains that temperature by automatic adjustment, and includes means for keeping the temperature of the handle and heat shield at a level which is safe for the carpeting and not uncomfortable for the operator.

SUMMARY OF THE INVENTION

The present invention provides an improved carpet seaming iron for face seaming carpets.

In one embodiment, the present invention provides a relatively lightweight carpet seaming iron having a baseplate with less thermal mass and more rapid and accurate thermal control than conventional carpet seaming irons.

In another embodiment, the present invention provides an electric carpet seaming iron having a baseplate with a bottom surface, a top surface, leading edge, a tapered trailing edge, and insulated connecting means, the top surface including a channel extending up from said top surface. A resistance-type heating element is mounted in the channel. A temperature control means is electrically connected to the heating element, and includes a sensor mounted on the top surface of the baseplate for automatically adjusting the current to the heating element to achieve and maintain a preset temperature. A heat shield is mounted over, and insulated from, the top surface of the baseplate. Insulation can be achieved by using an insulating gasket 42 between the heat shield and the baseplate, by using connecting means with poor heat conductivity to mount the heat shield to the baseplate, and by providing air inlets and outlets to permit air to flow over the top of the baseplate, rise, and escape from the front of the iron as the air becomes heated. A handle, having a hand grip, a base leading end and a base trailing end, a hot air outlet means at said base leading end for the escape of warm air rising up through said heat shield, and a guide means, tapering away from said base trailing end along the surface of the heat shield towards the trailing edge of the baseplate, for guiding two abutting carpet pieces into a hot melt adhesive strip which has been melted by the iron is also provided. An electric power cord can conveniently be provided through an end of the handle for powering the iron.

Other and further objects, features, advantages and embodiments of the present invention will become apparent to one skilled in the art from reading the Detailed Description of the Invention together with the drawings.

DETAILED DESCRIPTION OF THE INVENTION

An improved carpet seaming iron of the present invention is shown in FIGS. 1–5. A carpet seaming iron of the present invention is used for conventional face seaming of carpets to produce, for example, wall-to-wall carpeting installations. Face seaming is explained in more detail in U.S. Pat. No. 4,536,244 to Greci et al., which is incorporated herein by reference.

Figure 1:
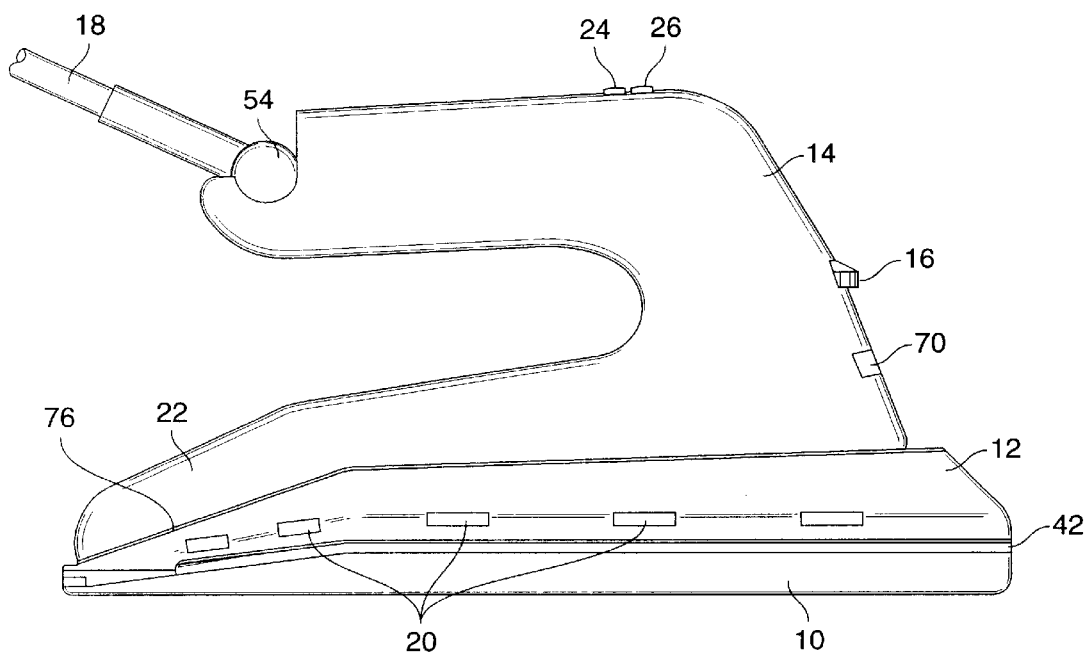
FIG. 1 is a side view of a carpet seaming iron of the present invention.

As shown in FIG. 1, an iron of the present invention includes a baseplate 10. Baseplate 10 is typically constructed from any durable material which demonstrates relatively high conductivity of heat (e.g., transmits heat relatively efficiently and with relatively little loss) and which has a melting point well above the normal range of temperatures at which an iron of this invention will operate. Aluminum is preferred because of its low cost, availability, and ease of forming into the desired shape.

Figure 3:
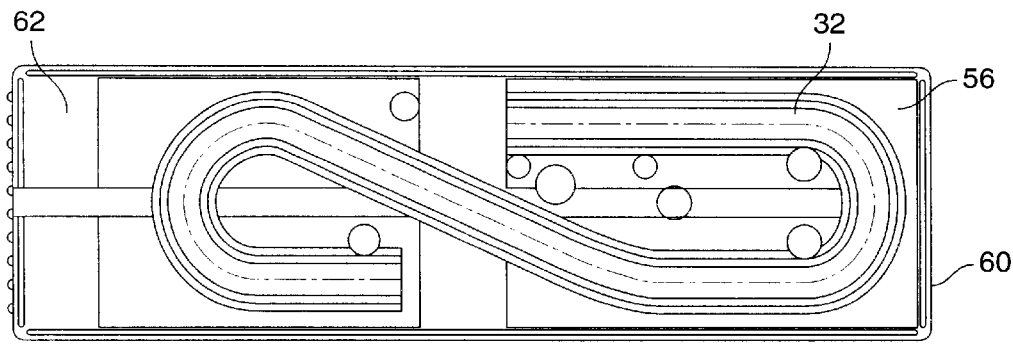
FIG. 3 is a top view of a base plate of the present invention.
Figure 4:
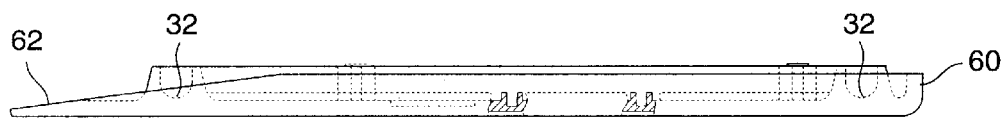
FIG. 4 is a side view of the base plate shown in FIG. 3.
Figure 5:
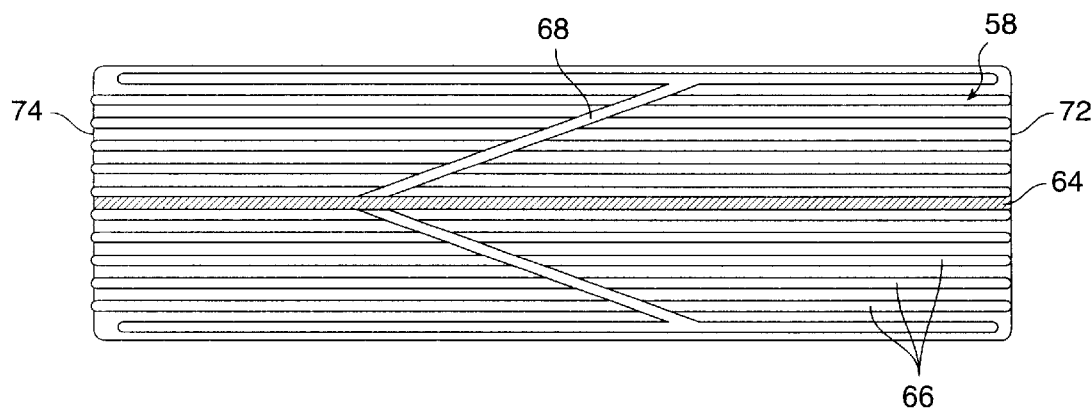
FIG. 5 is a bottom view of a base plate of the present invention.

As shown in FIGS. 2–5, baseplate 10 has a top surface 56 and a bottom surface 58. The bottom surface 58 is the surface which will contact and melt the hot melt adhesive layer on a strip of conventional hot melt carpet seaming tape. To prevent sticking, bottom surface 58 may be coated with any conventional no-stick coating, such as those used in conjunction with cooking utensils. As shown in FIG. 5, bottom surface 58 is preferably provided with a plurality of parallel ribs 66 extending from the leading edge 72 to the trailing edge 74, forming between them a series of grooves for channeling the molten hot melt adhesive. A deep center groove 64 is most preferably provided to form a raised center bead of molten adhesive which will coat the abutting edges of the two pieces of carpet being seamed as the carpet seaming iron passes and the seam is formed. In addition, a "V" groove 68 for feeding molten hot melt adhesive into the deep center groove 64 is also preferred. Alternatively, but less preferably, bottom surface 58 could be partially grooved, as shown in U.S. Pat. No. 4,714,514 to Hoopengardner, which is incorporated herein by reference, or it could be grooved without a deep center groove or "V" groove, or it could be completely flat, or have any other conventional surface suitable for melting hot melt adhesive for the face seaming of carpets.

Figure 2:
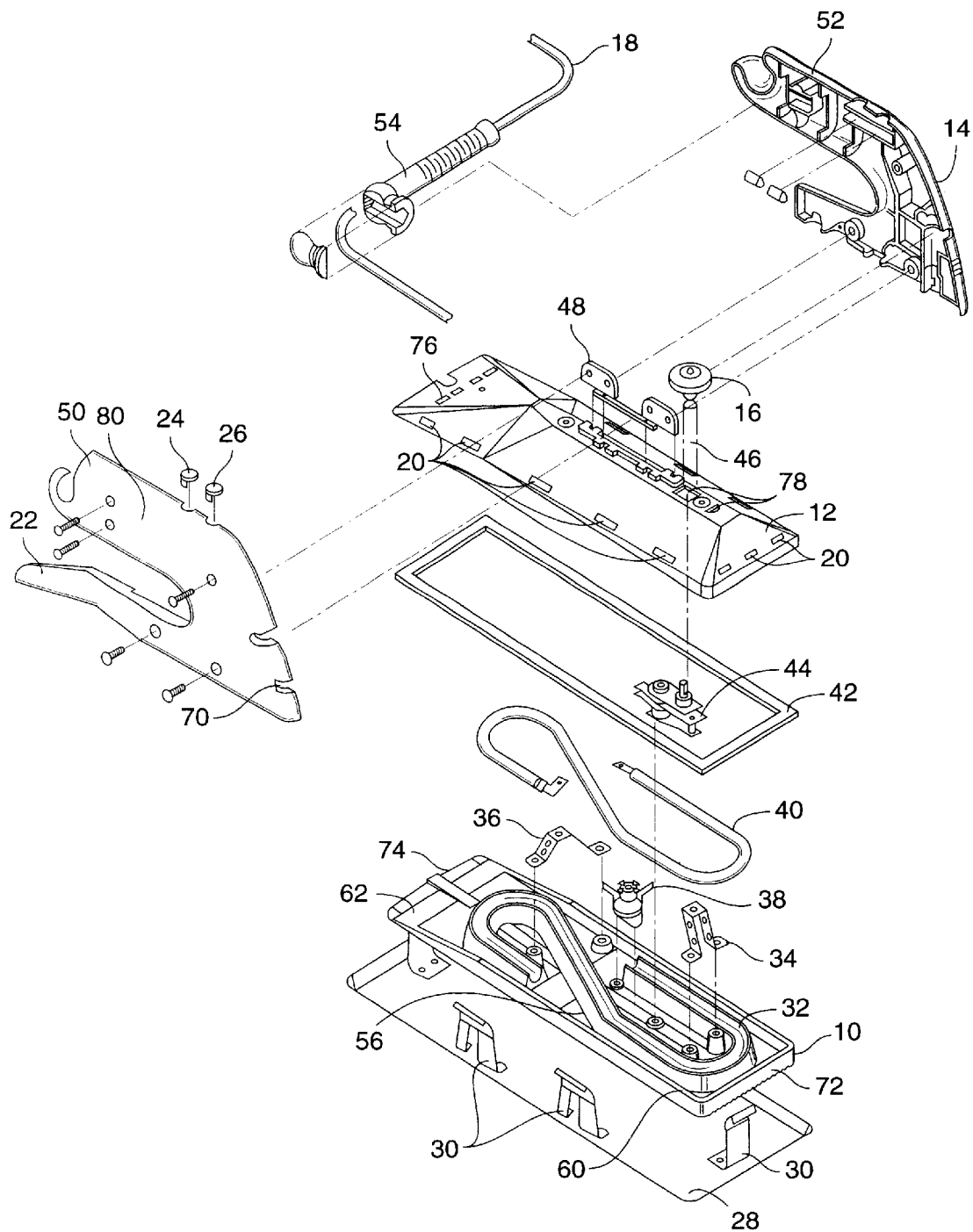
FIG. 2 is an exploded, perspective view of the carpet seaming iron shown in FIG. 1.

As shown in FIGS. 2–4, top surface 56 is provided with a raised channel 32 for encasing a heating element 40, which is preferably a conventional resistance-type heating element, as well as fastening means such as the preferred threaded sockets shown in FIG. 2 for receiving screws or other threaded fasteners. The distance between bottom surface 58 and top surface 56 (e.g., the thickness of the base plate) is substantially thinner than in conventional carpet seaming irons, and is substantially consistent from leading edge 72 rearwards to tapered trailing portion 62 where the distance gradually decreases to the trailing edge 74. A peripheral wall 60 is preferably provided which extends from one side of the trailing edge 74 along one side of baseplate 10, across the leading edge 72, along the opposite side of baseplate 10 to the opposite side of the trailing edge 74. Peripheral wall 60 extends upward from the top surface 56, and provides a sealing surface for insulating gasket 42.

Channel 32 extends above the top surface 56, and is of sufficient thickness to enable the heat from the heating element 40 to be efficiently transmitted, via the sides and bottom of channel 32, through baseplate 10 to the bottom surface 58 thereof. We believe that efficiency can be further increased by covering the top surface of channel 32 with an insulating material. Such insulating material can include any substantially non-conductive insulation such as, for example, insulating paper, asbestos, heat resistant plastics and resins, or ceramic materials, or poor conductors such as steel foil.

As shown in more detail in FIG. 4, the top edge of the walls forming channel 32 preferably extends above both the top surface 56 and the peripheral wall 60. Thus, the distance between the top surface of channel 32 and the bottom surface 58 is greater than the distance between either the top surface 56 and the bottom surface 58 or the top of the peripheral wall 60 and the bottom surface 58. Furthermore, the distance between the top surface of channel 32 and the bottom surface 58 is preferably greater than the distance between the top surface 56 and the bottom surface 58, since this enables the production of a carpet seaming iron which is very light weight (reduced thermal mass) in comparison with conventional carpet seaming irons, which is very efficient in transmitting heat through the base plate 10, and which is very responsive to adjust for temperature variations in the base plate from a desired, pre-set temperature.

For improved transmission of heat, it is preferred that the channel 32 be integral with the top portion 56 of baseplate 10. This can easily be achieved by machining the baseplate 10, including the channel 32, from a single piece of metal. Alternatively, this can be achieved by casting the baseplate 10 in a single piece.

Integral provision is also preferably made for mounting a temperature control device such as, for example, thermostat 44 to the top surface 56 of base plate 10. Optionally, and most preferably, a thermal shut-down device 38 is interposed between the temperature control device 44 and the heating element 40 for shutting down the iron in the event of failure of the temperature control device 44. Thermal shut-down device 38 can be a fusible link (non-cyclable), a ceramic disc thermostat (which is cyclable, and can be reset), or any other device capable of disconnecting electric power to the heating element 40 in the event the temperature of the heating element 40 exceeds normal operating temperatures.

Both temperature control device 44 and thermal shut-down device 38 are mounted to the top surface 56 of base plate 10 and include temperature sensors for sensing the temperature of the baseplate. In the case of the temperature control device 44, the preferred sensor is a conventional, integral bimetallic sensor. If the temperature of the baseplate is not at a temperature selected by the operator, the temperature control device 44 can stop or reduce the flow of current to heater element 40 when the sensed temperature is too high, and can initiate or increase current flowing to the heater element 40 when the sensed temperature is too low. If the temperature control device 44 fails, current will flow directly to the heater element 40, causing the temperature to rise. When the temperature sensed by the thermal shutdown device 38 reaches a level higher than that within the adjustment range of the temperature control device 44, the thermal shut-down device cuts off the flow of current to the heater element 40 to stop the generation of heat.

Because baseplate 10 is relatively thin, changes in temperature at the bottom surface 58 are quickly sensed at the top surface 56 by the sensor in temperature control switch 44, allowing for rapid and automatic adjustment of the temperature using the heater element 40. In combination with the reduced thermal mass of a baseplate of the present invention, the temperature control is quicker to adjust to changes in thermal output and, consequently, provides much more accurate control of temperature than in a conventional carpet seaming iron. Wiring is conventional. In the preferred embodiment, the temperature control switch 44 is electrically connected, and delivers electric power, to the heater element 40.

As shown in FIGS. 1 and 2, a heat shield 12 is mounted over baseplate 10. The purpose of heat shield 12 is to shield both the operator and the carpet from the temperatures generated at the top surface 56 of the baseplate. If the outer surface of heat shield 12 becomes too hot, carpet backings resting on the outer surface of the heat shield 12 can be damaged or degraded. In addition, a too-hot heat shield can present a safety hazard to the operator. Accordingly, heat shield 12 is most preferably formed from a material which is relatively non-conductive or a poor conductor of heat. While certain metals which are poor conductors, such as steel, can be used, we prefer using non-metallic materials which are better insulators and more light weight. We prefer using fiber reinforced heat resistant resins, such as, for example, polyphenylene sulfide resin reinforced with glass fibers (known as Ryton™, a tradename of Phillips Petroleum Company), which provides much cooler surface temperatures, and provide more favorable thermal characteristics, than steel.

Figure 6:
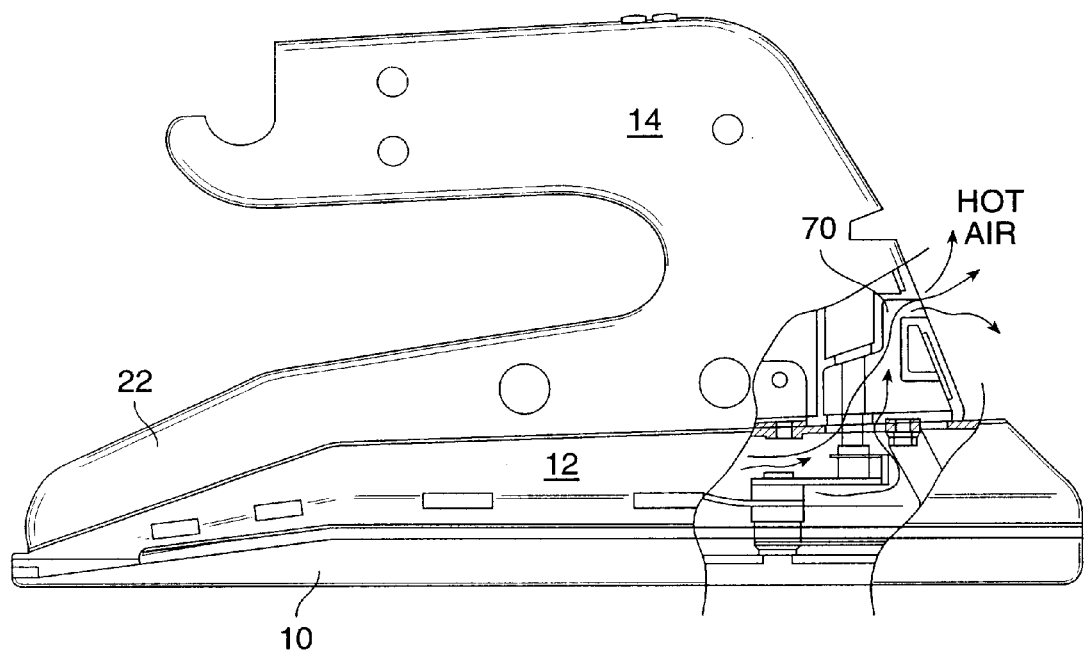
FIG. 6 is an air flow diagram showing the flow of warm air through openings in a heat shield of the present invention and out of an iron of the present invention.

The heat shield 12 also preferably provides a usefully angled surface against which the carpet backing rests as the carpet seaming iron is being moved along a seam line to melt the underlying carpet seaming tape. Most preferably, the heat shield is provided with a tapered trailing end 76 which mates with the trailing edge 74 of the baseplate to form a ramp inclining downwardly in the trailing direction for guiding the overlying carpet down into the molten adhesive for forming the seam. Heat shield 12 is mounted to the baseplate through connecting means 34, 36 preferably using conventional threaded fasteners. Connecting means 34, 36 are most preferably formed from relatively non-conductive or low conductive materials which will not easily transfer heat from the top surface 56 of baseplate 10 to heat shield 12. Steel is preferred because of its inexpensive cost and ready availability; however, other relatively poor conductors could also be used. An insulating gasket 42 is also preferably mounted between the baseplate 10 and the heat shield 12 to prevent transmission of heat from the baseplate to the heat shield 12. Most preferably, insulating gasket is positioned on top of the peripheral wall 60 and along the trailing edge 74 to prevent any direct contact between the heat shield 12 and the top of the base plate 10. Additional insulation of the heat shield 12 is obtained by providing one or more air inlets 20 about the periphery of the heat shield 12. Air inlets 12 allow air at room temperature to enter the space between the baseplate 10 and the heat shield 12. Openings 78 at the top, front end of the heat shield allow the heated air to rise and escape the space between the heat shield 12 and the baseplate 10, thus providing for the circulation of air which is cooler than the temperature of the baseplate 10 between the baseplate 10 and the heat shield 12. The air flow out of the iron through opening 78 is shown in more detail in FIG. 6.

As shown in FIG. 2, a shaft 46 passes through one of the openings 78 to connect heater control 44 to an operator control knob 16. Control knob 16 is formed from materials which are poor conductors of heat, and shaft 46 may be so constructed as well, although it is not necessary to do so. Control shaft 46 can be formed of brass, steel, or any other heat-resistant, durable material. Control knob 16 can be formed of heat-resistant plastic or resin. A bracket 48 is mounted to the top of heat shield 12 for mounting a handle 14 over the top of the heat shield 12, as shown in FIG. 1.

As shown in FIG. 2, handle 14 is preferably formed from a first handle half 50 and a second handle half 52, which preferably include integral alignment and channel means for mounting the two handle halves together over bracket 48 using conventional fastening means, such as the threaded fasteners shown. The handle 14 provides a convenient platform for mounting the iron controls, such as control knob 16 for which a port is provided in the front, leading part of the handle. The handle 14 also provides a conduit leading from openings 78 to outlet 70, thus permitting warm air rising through openings 78 to escape to the outside. A power cord 18 is also preferably provided for delivering electrical power through the temperature control switch 44 to the heating element 40. One end of the power cord 18 is preferably connected to the temperature control switch 44. The power cord is then routed through pre-formed conduits in the handle 14, and through a strain relief device 54, which preferably secures the cord in the end of the hand grip 80. We prefer using a strain relief device such as that described in allowed U.S. patent application Ser. No. 08/824,201 filed on Mar. 22, 1997, which is incorporated herein by reference.

Two indicator lamps 24, 26 are preferably provided. One indicator lamp 24 remains lighted during the entire time the iron is connected to power (e.g., so long as electric power is being delivered to the temperature control switch 44). The other lamp 26 is lighted whenever the temperature control switch 44 determines the temperature of the baseplate 10 is cooler than the preset, desired temperature and allows current to flow to the heater element 40 to raise the heat of the baseplate 10 to the desired, preset temperature. Once the desired temperature is achieved, current to the heating element 40 is discontinued and lamp 26 turns off. Of course, the function of lamp 24 and 26 could be alternated.

First handle half 50 also preferably includes a relatively thin guide 22 which tapers down over the inclined surface 76 of heat shield 12 towards the trailing edge 74 of base plate 10. Guide 22 helps to align the carpet seaming iron relative to the two carpet edges being seamed, and helps center those edges over the central bead of molten hot melt adhesive emerging from under the trailing edge 74 of the carpet seaming iron as the iron is moved along the carpet seaming tape, so that the edges will be coated by the central bead as they are pushed into abutment with each other.

As shown in FIG. 2, a stand 28 can be provided for resting a heated iron when the operator is required to perform other tasks. Stand 28 includes spring-type clips 30 which preferably secure the iron above the stand 28. Stand 28 can be made from any durable, heat resistant material; however, a material which is a poor conductor of heat, such as steel or a heat resistant plastic or resin, is preferred.

An iron of the present invention operates in a range of about 400 watts to about 650 watts, and most preferably at about 500 watts, for optimum seaming. This power level allows the heating element to remain under power when seaming in the range of about 2.5 feet per minute.

To use an iron of the present invention, the operator connects the power cord to an appropriate power source, such as a 120 volt outlet. Once connected, both indicator lamps 24, 26 are lit. The operator can hen set the desired temperature by rotating control knob 16. When the iron reaches the desired temperature, indicator lamp 26 goes out, and the operator can use the iron to seam two abutting pieces of carpet. The operator lifts the two abutting edges of carpet at one end of the seam, and, grasping the handgrip 80, places the bottom surface 58 of the base plate 10 over the hot melt adhesive strip on the carpet seaming tape which has been centered along the seam line. The carpet backing rests upon the angled top surface of the heat shield 12. The operator then moves the carpet seaming iron from one end of the seam line to other in a slow, controlled fashion. As the operator moves the iron over the hot melt carpet seaming tape, the hot melt adhesive melts and is channeled through the grooves between ribs 66. The motion of the iron channels some of the hot melt adhesive into the "V" groove 68, which feeds molten adhesive into the deep center groove 64. As the iron passes, the hot melt adhesive emerges from under the trailing edge 74 of the baseplate 10, and preferably includes an upstanding, central bead of molten adhesive. The carpet edges encounter the guide 22, which centers the iron between the edges. As the iron continues to move down the seam line, the carpet behind the iron falls back into abutting position, encountering the raised central bead, which coats the abutting edges with molten adhesive. In some cases, the operator will also push the carpet behind the trailing edge 74 down into the molten adhesive strip and into abutting relationship with each other to ensure a strong seam. The molten adhesive typically cures within tens of seconds. The transfer of heat from the baseplate 10 to the hot melt adhesive will cause the temperature of the baseplate 10 to drop. Once the drop in temperature is sensed by the temperature control switch 44, the current to the heating element 40 is turned on and the indicator lamp 26 will light. Once the baseplate 10 temperature returns to the preset level, the current to the heating element 40 will again be turned off and the indicator lamp 26 will turn off. This process will typically be repeated many times while the iron is in use. As the iron continues along the seam line, air is drawn into the area between the heat shield 12 and the baseplate 10 through the air inlets 20. As this insulating air is heated by the baseplate 10 and the heating element 40, it rises through openings 78 in the top of the heat shield, through a conduit provided at the leading edge portion of the handle 14, and out through an outlet 70 which is positioned above the carpet being seamed. Thus, the carpet backing, which rests upon the heat shield during seaming, is kept relatively cool. At the end of the seaming process, the operator can disconnect the power cord from the power source to allow the iron to cool down. Once this has been done, both indicator lamps 24, 26 will no longer be illuminated.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

What is claimed is:

1. An electric carpet seaming iron comprising:
   a baseplate having a bottom surface, a top surface, leading edge, a trailing edge, and a connecting means, said top surface including a channel extending up from said top surface;
   a heating element mounted in said channel;
   a temperature control means electrically connected to said heating element;
   a heat shield mounted over said top surface of said baseplate, said heat shield including at least one air inlet positioned on an exposed, outer surface of said heat shield for permitting air to enter an interior of said heat shield;
   a handle mounted to said heat shield, said handle having a hand grip, a base leading end and a base trailing end, a hot air outlet means at said base leading end for the escape of warm air rising up through said heat shield; and,
   a means for providing electrical power through said temperature control means to said heating element.

2. The carpet seaming iron of claim 1 wherein said heat shield is a non-metallic heat shield.

3. The carpet seaming iron of claim 1 wherein an insulating gasket is interposed between said heat shield and said baseplate.

4. The carpet seaming iron of claim 1 wherein said temperature control means includes a means for sensing the temperature of the baseplate.

5. The carpet seaming iron of claim 1 wherein said temperature control means additionally includes a means for enabling an operator to set the temperature control means to heat the baseplate to a desired temperature.

6. The carpet seaming iron of claim 1 wherein said means for providing electrical power is a power cord having a first end passing through said hand grip and operably connected to said temperature control means and having a second end with a plug operably connected thereto which is compatible with a conventional electric socket.

7. The carpet seaming iron of claim 1 wherein said channel is integral with said top surface, and wherein a distance between said top surface and said bottom surface of said baseplate is smaller than a distance between said bottom surface of said baseplate and a top surface of said channel.

8. The carpet seaming iron of claim 1 wherein said baseplate connecting means is formed from a material which has relatively low conductivity to heat.

9. The carpet seaming iron of claim 8 wherein said material is steel.

10. The carpet seaming iron of claim 1 wherein said handle additionally includes a guide means tapering away from said base trailing end along an outer surface of said heat shield towards said trailing end of said baseplate, for guiding two abutting carpet pieces into a hot melt adhesive strip which has been melted by the iron.

11. The carpet seaming iron of claim 1 additionally including insulating material covering a top surface of said channel to encase said heating element.

12. A carpet seaming iron for seaming two abutting edges of carpet with hot melt adhesive to form a carpet seam, the iron comprising:
   a baseplate having a bottom surface, a top surface, a first side, a leading edge, a second side, and a trailing edge, a connecting means on said top surface, a peripheral wall extending along at least said first side, said leading edge, and said second side, and a channel integral with and extending up from said top surface, and wherein a distance between said bottom surface and a top surface of said channel is greater than said distance between said bottom surface and said top surface of said baseplate;
   a heating element mounted in said channel;
   a temperature control means electrically connected to said heating element;
   an insulating gasket positioned over said peripheral wall and said trailing end of said baseplate;
   a heat shield positioned on said gasket and mounted to said connecting means, said heat shield including a means for ventilating the heat shield so that room temperature air can be drawn into the space between the heat shield and the baseplate to prevent the outer surface of the heat shield from becoming too hot;
   a handle mounted to said heat shield, said handle having a handgrip portion, a leading edge and a trailing end, said handle including an operator control for setting a desired temperature of the iron, a hot air outlet means at said leading end for the escape of warm, insulating air rising up through said heat shield; and, a means for providing electrical power through said temperature control means to said heating element.

13. The iron of claim 12 wherein said baseplate is formed from a material having relatively high conductivity to heat.

14. The iron of claim 13 wherein said baseplate is formed from aluminum.

15. The carpet seaming iron of claim 12 wherein said heat shield is formed from a material having relatively low conductivity to heat.

16. The carpet seaming iron of claim 12 wherein said heat shield is formed from a durable, heat-resistant fiber and resin material.

17. The carpet seaming iron of claim 12 wherein said temperature control means includes a means for sensing the temperature of the baseplate.

18. The carpet seaming iron of claim 12 wherein said channel is integral with said top surface to expedite transmission of heat through the baseplate to the bottom surface.

19. The carpet seaming iron of claim 12 wherein said baseplate connecting means is formed from a material which has relatively low conductivity to heat to limit any direct transmission of heat from the baseplate to the heat shield.

20. The carpet seaming iron of claim 19 wherein said material is steel.

21. The carpet seaming iron of claim 12 wherein said handle includes a guide means, tapering away from said trailing end of said handle, for guiding two abutting carpet pieces into the molten adhesive created behind the iron as the iron is moved along a length of hot melt carpet seaming tape.

22. The carpet seaming iron of claim 12 additionally comprising an insulating material mounted across a said top surface of said channel for encasing said heating element.

* * * * *